(12) United States Patent
Pulli et al.

(10) Patent No.: US 9,412,042 B2
(45) Date of Patent: Aug. 9, 2016

(54) INTERACTION WITH AND DISPLAY OF PHOTOGRAPHIC IMAGES IN AN IMAGE STACK

(71) Applicant: NVIDIA Corporation, Santa Clara, CA (US)

(72) Inventors: Kari Pulli, Palo Alto, CA (US); Orazio Gallo, Santa Cruz, CA (US); David Jacobs, Westlake Village, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 433 days.

(21) Appl. No.: 13/870,901

(22) Filed: Apr. 25, 2013

(65) Prior Publication Data

US 2014/0079279 A1    Mar. 20, 2014

Related U.S. Application Data

(60) Provisional application No. 61/703,189, filed on Sep. 19, 2012.

(51) Int. Cl.
*G06K 9/62* (2006.01)
*G06T 5/50* (2006.01)
*G06F 17/30* (2006.01)
*G06T 5/00* (2006.01)

(52) U.S. Cl.
CPC ........ *G06K 9/6202* (2013.01); *G06F 17/30247* (2013.01); *G06T 5/50* (2013.01); *G06T 5/007* (2013.01); *G06T 2200/24* (2013.01); *G06T 2207/20208* (2013.01); *G06T 2207/20212* (2013.01); *G09G 2340/045* (2013.01); *G09G 2340/10* (2013.01); *G09G 2380/16* (2013.01)

(58) Field of Classification Search
CPC .......... G06T 5/50; G06T 5/007; G06T 5/008; G06T 2207/20208; G06T 2207/20212; H04N 5/2355
USPC .................................................. 382/254, 255
See application file for complete search history.

(56) References Cited

U.S. PATENT DOCUMENTS

| 7,519,907 B2* | 4/2009 | Cohen et al. ................... 715/723 |
| 7,688,379 B2* | 3/2010 | Forman et al. ................ 348/356 |
| 2008/0131019 A1* | 6/2008 | Ng ............................ G06T 5/001 382/255 |
| 2009/0290037 A1* | 11/2009 | Pore .................... H04N 5/23222 348/222.1 |
| 2009/0309990 A1* | 12/2009 | Levoy et al. ................ 348/222.1 |
| 2009/0319897 A1* | 12/2009 | Kotler et al. ................... 715/711 |
| 2010/0128145 A1* | 5/2010 | Pitts et al. ................. 348/231.99 |
| 2011/0032268 A1* | 2/2011 | Takei ....................... G06T 13/80 345/589 |
| 2011/0044549 A1* | 2/2011 | Bressan ........................ 382/225 |
| 2011/0103685 A1* | 5/2011 | Bhatt ............................ 382/167 |
| 2012/0236020 A1* | 9/2012 | Paris et al. ...................... 345/589 |
| 2012/0306906 A1* | 12/2012 | Johnson et al. ................ 345/591 |
| 2013/0121618 A1* | 5/2013 | Yadav ............................ 382/294 |
| 2014/0029868 A1* | 1/2014 | Lorenz et al. .................. 382/302 |

* cited by examiner

*Primary Examiner* — Michael A Newman

(57) ABSTRACT

A number of images of a scene are captured and stored. The images are captured over a range of values for an attribute (e.g., a camera setting). One of the images is displayed. A location of interest in the displayed image is identified. Regions that correspond to the location of interest are identified in each of the images. Those regions are evaluated to identify which of the regions is rated highest with respect to the attribute relative to the other regions. The image that includes the highest-rated region is then displayed.

18 Claims, 8 Drawing Sheets

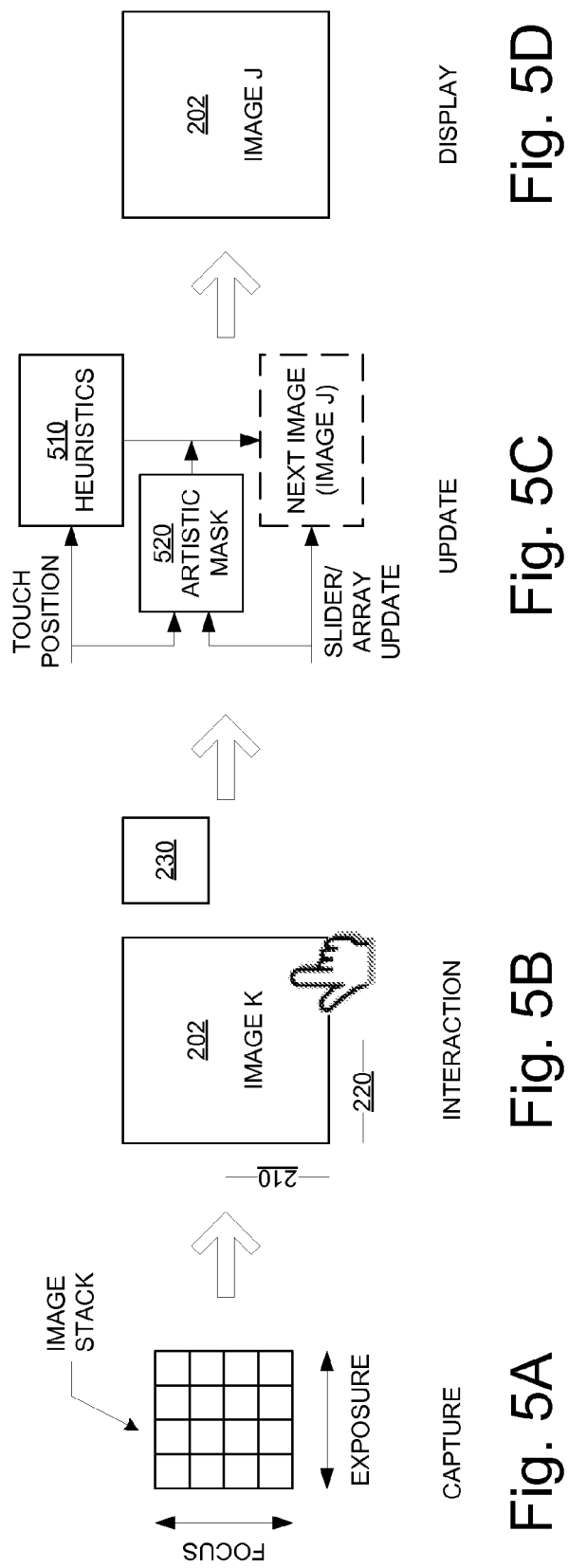

800
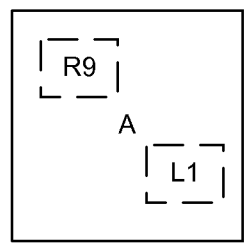 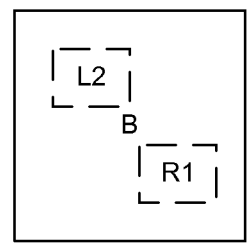 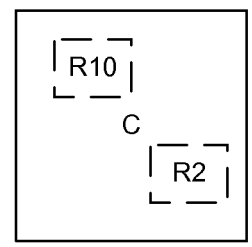
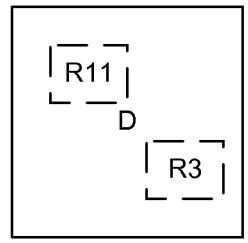 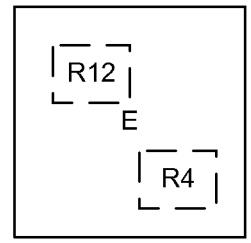 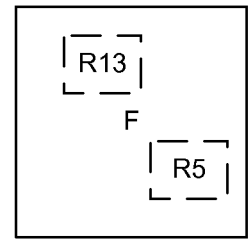
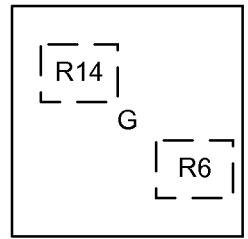 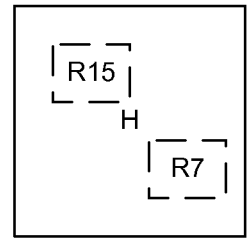 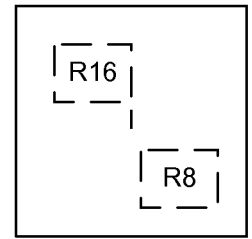
Fig. 8

INTERACTION WITH AND DISPLAY OF PHOTOGRAPHIC IMAGES IN AN IMAGE STACK

RELATED U.S. APPLICATION

This application claims priority to the U.S. Provisional application filed on Sep. 19, 2012, entitled "Dynamic Image Bursts," Ser. No. 61/703,189, by Pulli et al., hereby incorporated by reference in its entirety.

BACKGROUND

The traditional photographic process utilizes analog film and is guided by a relatively fixed paradigm: capture, develop, and print. Analog film has pretty much given way to digital sensors, and consequently services that once required expertise and darkrooms can now be performed by the broader population using readily accessible post-processing software.

Stack-based photography aims at overcoming the limitations of standard digital cameras by taking a sequence (stack) of images with different capture parameters (e.g., different focus distances and/or exposure times), and then combining those images into a single image that "best" represents the image stack. Thus, the traditional workflow has largely remained the same: capture, perform some optional processing, and produce a single final image that is perhaps printed.

The human visual system does not, however, see everything in a real-world scene at once. Rather, the eyes move over the scene adapting for the amount of light and required focus at each location. At any given time, for instance, the eyes can only handle a dynamic range of approximately 1:100, and the perception of the scene is not impacted by the fact that objects outside of the current region of interest saturate to black or white. Similar considerations apply to focus and to color perception, which depend on the point of attention and on the spatial distance of other colors from the point of attention.

Also, the tendency today is to rarely if ever print pictures. Instead, pictures are viewed on digital screens: computer monitors, cameras, smart phones, tablets, or other potentially interactive display surfaces. Yet, despite the additional degrees of freedom that digital displays offer and the aforementioned tendencies of the human visual system, much of the time only a single static image, conventionally generated from a stack of images as described above, is displayed.

Accordingly, most computational photography techniques are still designed to enhance the capture capabilities of modern cameras in the context of the static print paradigm: create an image that captures and visualizes a larger portion of the dynamic range, or create an image with a larger depth of field. Accomplishing these goals often involves hardware in the form of exotic sensor architectures or unusual optics, as is the case for high dynamic range (HDR) imaging or all-in-focus imaging. Stack-based photography achieves similar results with standard camera hardware. However, most of these approaches do not capitalize on the additional degrees of freedom available when pictures are viewed on display monitors.

Additionally, some existing techniques that are used to reduce image stacks to a single picture demand pixel-accurate registration in order to avoid ghosting and misalignment artifacts that can negate the benefits that might be achieved by capturing multiple images. Even when pixel-accurate registration is possible, compositing techniques generally must compromise on one aspect of image quality in order to improve another. For example, when an HDR image is tone-mapped to a low dynamic range (LDR) image suitable for print or conventional displays, either the local or the global contrast, often both, has to be lowered.

SUMMARY

Embodiments according to the present invention pertain to "dynamic image stacks," an interactive alternative to conventional static stack-based photography such as that described above. Dynamic image stacks empower users to interactively explore and perceive different aspects of a scene. Each image presented to the user is the best one in the image stack with respect to a user-specified location of interest within a scene, increasing the quality of the overall perception of the scene.

In one embodiment, a stack of images of a scene are captured and stored. The images in the stack are captured over a range of values for a capture parameter or attribute (e.g., a camera setting such as exposure time, focus distance, or white balance). One of the images in the stack is displayed. A location of interest in the displayed image is identified. Regions that correspond to the location of interest are identified in each of the other images in the stack. Those regions are evaluated to identify which region is rated highest relative to the other regions with respect to the aforementioned attribute. For example, if the images in the image stack are captured at different focus distances, the regions in those images that correspond to the location of interest are evaluated to identify the image in which the region corresponding to the location of interest is deemed best with respect to focus (has the best focus in the region corresponding to the location of interest). That image is then displayed.

Similarly, the images of a scene can be captured over a range of values for two or more capture parameters or attributes (e.g., another camera setting). For example, images of a scene can be captured at different focus distances and at different exposure times. For example, there may be four different exposure times and four different focus distances, in which case 16 images of the scene are captured, one image for each combination of exposure time and focus distance. As described above, one of the images is displayed, a location of interest in the displayed image is identified, and regions that correspond to the location of interest are identified in each of the other images in the image stack. Those regions are evaluated to identify which region is rated highest with respect to the first and second attributes relative to the other regions. In one embodiment, the evaluation is performed in two phases: first, for example, an image deemed best (rated highest) with respect to exposure in the region corresponding to the location of interest is identified at each focus distance, and then those images are evaluated to identify the image deemed best (rated highest) with respect focus in the region corresponding to the location of interest. That image is then displayed.

To facilitate accessing and viewing images as just described, a graphical user interface (GUI) can be displayed on a user's device to allow a user to readily identify the location of interest and/or select an image according to the image's attributes. To identify the location of interest, in one embodiment, the user taps (touches) the displayed image at the location of interest. In response, the image that is highest-rated (as described above) is found and displayed. Other methods can be used to identify the location of interest, as will be described herein.

Thus, in embodiments according to the invention, a stack of images is captured and, for each location of interest to a user, an image that best represents that location (e.g., is most correctly exposed and is best focused relative to the other images in the stack) is displayed. Instead of the traditional paradigm of presenting a single image that summarizes the stack of images, different images of the scene can be displayed depending on what part of the scene the user is interested in. If, for example, the user is interested in one part of the scene, an image that best represents that part is displayed and, if the user then is interested in another part of the scene, an image that best represents that other part is then displayed. A scene can thus be represented and visualized using several images.

Instead of the user (e.g., a viewer) selecting the order in which the images are displayed as described above, the user or the photographer can specify an order in which the images are displayed. In essence, the images can be presented as single-scene slide show that guides a viewer through a tour of the scene.

To allow a user to select an image based on one or more of its attributes, in one embodiment, the GUI includes a one-dimensional slider bar and indicator for each attribute. That is, for example, a first slider bar and indicator associated with the exposure settings can be displayed, and a second slider bar and indicator associated with the focus settings can also be displayed. The user can move the first indicator to a position along the first slider bar to display an image captured at a corresponding exposure setting (at the focus setting indicated by the position of the second indicator on the second slider bar), and can move the second indicator to a position along the second slider bar to display an image captured at a corresponding focus setting (at the exposure setting indicated by the position of the first indicator on the first slider bar).

In another embodiment, to allow a user to select an image based on its attributes, the GUI includes a two-dimensional array. One axis of the array corresponds to the first attribute, and the other axis of the array corresponds to the other attribute. Positions in the array correspond to tuples (combinations) of the settings for the first attribute and the settings for the second attribute. The user can touch a position in the array to select a specific combination of a setting for the first attribute and a setting for the second attribute, and the image corresponding to the selected combination is then displayed.

Different approaches can be used to transition from one image to another. In general, if the difference in a measure of an image attribute between a first image and a second image is too large (e.g., exceeds a threshold value), then a first approach can be used; otherwise, a second approach can be used. For example, if the difference in exposure values between two images is too large, then interpolation between the two images can be used to transition from the first image to the second image; if the difference is not too large, then the transition can be achieved by cross-fading.

In summary, embodiments according to the present invention introduce new ways of exploring photographic images that are interactive and fun, offering a richer viewing experience, providing new outlets for artistic expression, and taking fuller advantage of the flexibility available when pictures are viewed on display monitors. By allowing a user to interact with multiple images of a scene, the perceived image quality of the scene can be increased and the user may better appreciate image qualities such as scene illuminance and spatial relationships. User interaction is facilitated by user-friendly GUI elements. Because the stack of images is not combined into a single representative image, artifacts are avoided.

These and other objects and advantages of the various embodiments of the present disclosure will be recognized by those of ordinary skill in the art after reading the following detailed description of the embodiments that are illustrated in the various drawing figures.

BRIEF DESCRIPTION OF THE DRAWINGS

The accompanying drawings, which are incorporated in and form a part of this specification and in which like numerals depict like elements, illustrate embodiments of the present disclosure and, together with the description, serve to explain the principles of the disclosure.

FIGS. 5A, 5B, 5C, and 5D illustrate stages in a process for capturing and interacting with images in an image stack in an embodiment according to the present invention.

FIG. 8 illustrates a representation of images in an image stack in an embodiment according to the present invention.

DETAILED DESCRIPTION

Figure 1:
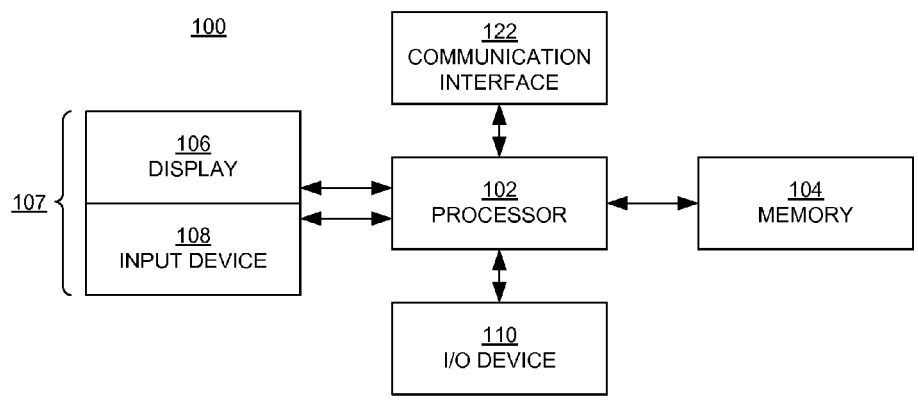
FIG. 1 is a block diagram of an example of a computing system capable of implementing embodiments according to the present disclosure.

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those utilizing physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "receiving," "displaying," "identifying," "accessing," "generating," "evaluating," "specifying," "comparing," "tracking," "selecting," or the like, refer to actions and processes (e.g., flowcharts 700 and 900 of FIGS. 7 and 9, respectively) of a computer system or similar electronic computing device or processor (e.g., the computing system 100 of FIG. 1). The computer system or similar electronic computing device manipulates and transforms data represented as physical (electronic) quantities within the computer system memories, registers or other such information storage, transmission or display devices.

Embodiments described herein may be discussed in the general context of computer-executable instructions residing on some form of computer-readable storage medium, such as program modules, executed by one or more computers or other devices. By way of example, and not limitation, computer-readable storage media may comprise non-transitory computer-readable storage media and communication media; non-transitory computer-readable media include all computer-readable media except for a transitory, propagating signal. Generally, program modules include routines, programs, objects, components, data structures, etc., that perform particular tasks or implement particular abstract data types. The functionality of the program modules may be combined or distributed as desired in various embodiments.

Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can accessed to retrieve that information.

Communication media can embody computer-executable instructions, data structures, and program modules, and includes any information delivery media. By way of example, and not limitation, communication media includes wired media such as a wired network or direct-wired connection, and wireless media such as acoustic, radio frequency (RF), infrared, and other wireless media. Combinations of any of the above can also be included within the scope of computer-readable media.

FIG. 1 is a block diagram of an example of a computing system 100 capable of implementing embodiments according to the present disclosure. The computing system 100 broadly represents any single or multi-processor computing device or system capable of executing computer-readable instructions. Examples of a computing system 100 include, without limitation, a laptop, tablet, or handheld computer. The computing system 100 may also be a type of computing device such as a cell phone, smart phone, media player, camera, or the like. Depending on the implementation, the computing system 100 may not include all of the elements shown in FIG. 1, and/or it may include elements in addition to those shown in FIG. 1.

In its most basic configuration, the computing system 100 may include at least one processor 102 and at least one memory 104. The processor 102 generally represents any type or form of processing unit capable of processing data or interpreting and executing instructions. In certain embodiments, the processor 102 may receive instructions from a software application or module. These instructions may cause the processor 102 to perform the functions of one or more of the example embodiments described and/or illustrated herein.

The memory 104 generally represents any type or form of volatile or non-volatile storage device or medium capable of storing data and/or other computer-readable instructions. In certain embodiments the computing system 100 may include both a volatile memory unit (such as, for example, the memory 104) and a non-volatile storage device (not shown).

The computing system 100 also includes a display device 106 that is operatively coupled to the processor 102. The display device 106 is generally configured to display a graphical user interface (GUI) that provides an easy to use interface between a user and the computing system.

The computing system 100 also includes an input device 108 that is operatively coupled to the processor 102. The input device 108 may include a touch sensing device (a touch screen) configured to receive input from a user's touch and to send this information to the processor 102. The processor 102 interprets the touches in accordance with its programming.

An input device 108 may be integrated with the display device 106 or they may be separate components. In the illustrated embodiment, the input device 108 is a touch screen that is positioned over or in front of the display device 106. The input device 108 and display device 106 may be collectively referred to herein as a touch screen display 107.

The communication interface 122 of FIG. 1 broadly represents any type or form of communication device or adapter capable of facilitating communication between the example computing system 100 and one or more additional devices. For example, the communication interface 122 may facilitate communication between the computing system 100 and a private or public network including additional computing systems. Examples of a communication interface 122 include, without limitation, a wired network interface (such as a network interface card), a wireless network interface (such as a wireless network interface card), a modem, and any other suitable interface. In one embodiment, the communication interface 122 provides a direct connection to a remote server via a direct link to a network, such as the Internet. The communication interface 122 may also indirectly provide such a connection through any other suitable connection. The communication interface 122 may also represent a host adapter configured to facilitate communication between the computing system 100 and one or more additional network or storage devices via an external bus or communications channel.

As illustrated in FIG. 1, the computing system 100 may also include at least one input/output (I/O) device 110. The I/O device 110 generally represents any type or form of input device capable of providing/receiving input or output, either computer- or human-generated, to/from the computing system 100. Examples of an I/O device 110 include, without limitation, a keyboard, a pointing or cursor control device (e.g., a mouse), a speech recognition device, or any other input device.

Many other devices or subsystems may be connected to computing system 100. Conversely, all of the components and devices illustrated in FIG. 1 need not be present to practice the embodiments described herein. The devices and subsystems referenced above may also be interconnected in different ways from that shown in FIG. 1. The computing system 100 may also employ any number of software, firmware, and/or hardware configurations. For example, the example embodiments disclosed herein may be encoded as a computer program (also referred to as computer software, software applications, computer-readable instructions, or computer control logic) on a computer-readable medium.

The computer-readable medium containing the computer program may be loaded into the computing system 100. All or a portion of the computer program stored on the computer-readable medium may then be stored in the memory 104. When executed by the processor 102, a computer program loaded into the computing system 100 may cause the processor 102 to perform and/or be a means for performing the functions of the example embodiments described and/or illustrated herein. Additionally or alternatively, the example embodiments described and/or illustrated herein may be implemented in firmware and/or hardware.

Figure 2:
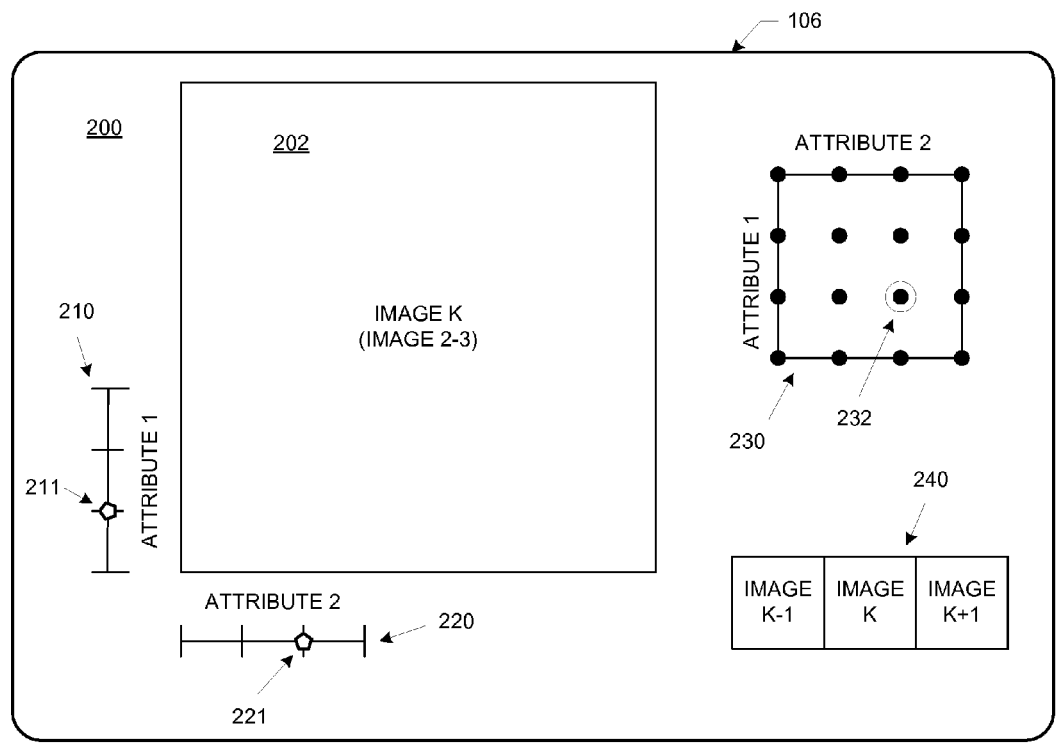
FIG. 2 illustrates an example of a graphical user interface that facilitates interaction with images in an image stack in an embodiment according to the present invention.

FIG. 2 illustrates a graphical user interface (GUI) 200 that facilitates interaction with image stacks in an embodiment according to the present invention. The GUI 200 can be displayed on the display device 106 of FIG. 1, for example. The example of FIG. 2 shows particular GUI elements in a particular arrangement; however, embodiments according to the invention are not so limited. The GUI can include elements other than those shown, and the arrangement of GUI elements can be different from that shown.

Figures 3, 4A:
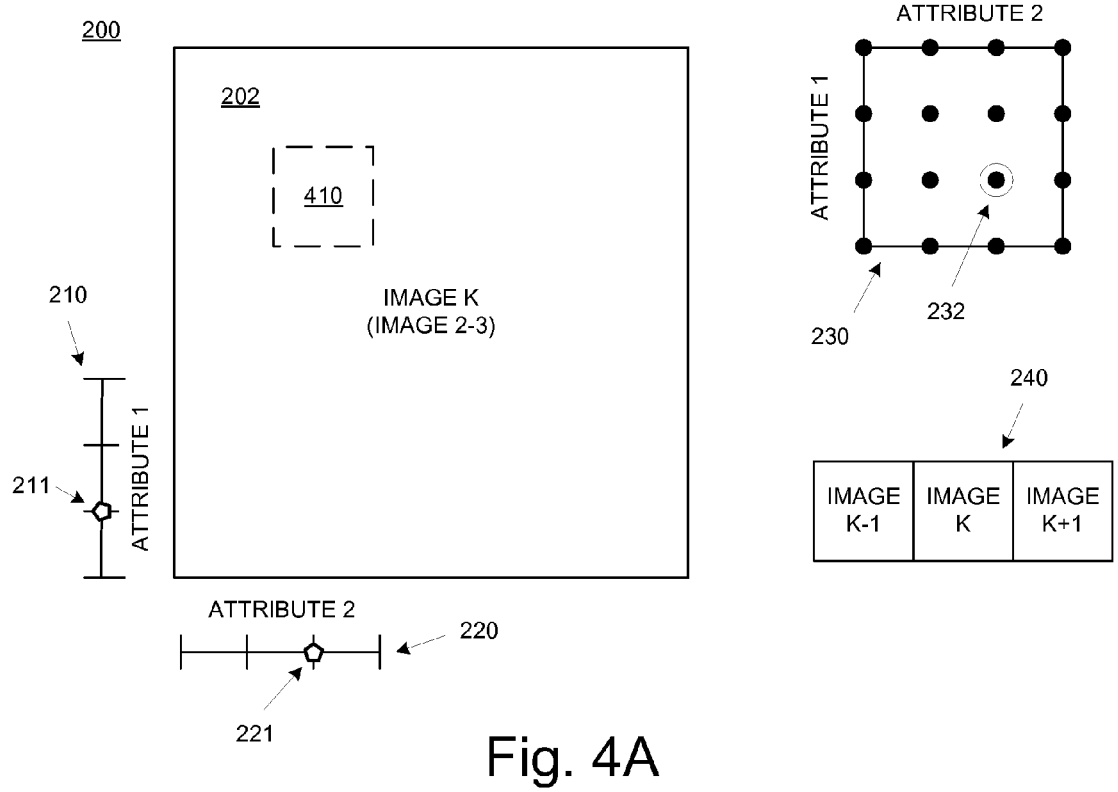
FIG. 3 illustrates a representation of images in an image stack in an embodiment according to the present invention.
FIGS. 4A and 4B illustrates examples of a graphical user interface that facilitates interaction with images in an image stack in an embodiment according to the present invention.

With reference to FIG. 3, an image stack 300 is stored in memory (e.g., the memory 104 of FIG. 1) and includes some number of images of a particular scene. The images in an image stack are captured sequentially but at different camera settings. For example, the image stack 300 might include M×N images of a scene, captured at each possible combination of M different settings for a first attribute or camera setting and N different settings for a second attribute or camera setting, in which case there would be two attributes associated with each image in the image stack. Images might be captured using combinations of more than two settings, in which case there may be more than two settings/attributes associated with each image. The attributes/settings may include, but are not limited to, focus distance, exposure time, and white balance. In addition to the differences associated with the different camera settings, there may be differences from one image to another in the image stack because, during the time it takes to capture all images in the image stack, an object in the scene may move or the camera itself may move, for example.

In the example of FIG. 2, an image K (one of the images in the image stack 300) is displayed in the display portion 202 of the GUI 200. The image K may be any one of the images in the image stack 300. Subsequently, other images in the image stack are selected and displayed in response to user inputs or in a predetermined order, for example. Thus, in embodiments according to the present invention, the images in the image stack 300 are not necessarily composited into a single tone-mapped or all-in-focus image. Consequently, as will be seen from the discussion below, new, interactive and fun ways of exploring photographic images are introduced, offering a richer viewing experience, providing new outlets for artistic expression, and taking fuller advantage of the flexibility available when pictures are viewed on display monitors. A user can interact with multiple images of a scene, increasing the perceived image quality of the scene and increasing appreciation of image qualities such as scene illuminance and spatial relationships. Furthermore, in contrast to conventional paradigms in which the stack of images is combined into a single representative image, artifacts are avoided.

Continuing with reference to FIGS. 2 and 3, the GUI 200 includes a number of features that facilitate navigation through the other images in the image stack 300. The first of these elements includes, in one embodiment, a first slider bar 210 and a first indicator 211 that are associated with one of the attributes/camera settings. In one such embodiment, the GUI 200 also includes a second slider bar 220 and a second indicator 221 that are associated with another of the attributes/camera settings. For example, the first slider bar and first indicator may be associated with focus, and the second slider bar and second indicator may be associated with exposure. Although two slider bars and indicators are shown in FIG. 2, embodiments according to the invention are not so limited. In general, there can be a slider bar and indicator for each camera setting/attribute associated with the images in the image stack; if there are more than two attributes/settings associated with each image in the image stack, there may be more than two slider bars and indicators.

In the FIG. 2 example, a user can navigate through the image stack 300 by moving the first indicator 211 along the first slider bar 210 and/or by moving the second indicator 221 along the second slider bar 220. If, for example, the image 2-3 (representing the image captured using setting 2 of the first attribute and setting 3 of the second attribute) is on display in the display portion 202, and the user moves the first indicator 211 to a position corresponding to setting 3 of the first attribute and does not move the second indicator 221, then the image 3-3 would instead be displayed.

The GUI 200 of FIG. 2 also includes, in one embodiment, a two-dimensional array 230 that represents the image stack 300. One dimension (axis) of the array 230 (e.g., the left axis) corresponds to the first attribute, and the other dimension (e.g., the bottom axis) corresponds to the second attribute. Each position in the array 230 corresponds to a particular tuple (combination) of the first and second attributes. For example, if the image 2-3 of FIG. 3 is being displayed in the display portion 202, then the position 232 corresponding to that image can be identified within the array 230 in some manner. For example, the position in the array 230 that corresponds to the image being displayed can be highlighted using a different color or added brightness. In one embodiment, if the user touches a different position in the array 230, then the image in the image stack 300 corresponding to the new position is then displayed in the display portion 202.

In one embodiment, the GUI 200 also includes an element 240 that presents the images in the image stack 300 in a prescribed order (e.g., the order in which the images were captured, or perhaps an order specified by a user). A user can scroll through the images in the image stack 300 by, for example, moving his/her finger in one direction or another across the element 240.

Furthermore, with reference to FIG. 4A, a user can select a portion of the displayed image K to identify a location of interest within that image. In the FIG. 1 embodiment, the user can touch the image K that is displayed in the display portion 202 to identify a location of interest. Note that selecting a location of interest is analogous to selecting an object in the displayed image—in other words, selecting an object of interest in an image is equivalent to selecting a location of interest, because the object has a location within the image and on the display screen.

The location of interest can be defined as a region surrounding the location selected (e.g., touched) by the user. For example, the location selected by a user can be defined by some number of pixels, where the number corresponds to about the size of a typical fingertip, and the location of interest can be defined as some number of pixels around that location.

Once a location of interest is selected, an image processing application (discussed below) evaluates the various images in the image stack 300 to identify which image in the image stack includes a region that corresponds to the location of interest and that is rated "best" with respect to the attribute or attributes associated with the images in the image stack. Alternatively, a user can make the decision about which image best represents the location of interest. In other words, a relatively objective decision can be made using software, for example, while a relatively subjective decision can be made by a user.

For example, if the images in the image stack 300 were captured at different values of focus distance and different values of exposure time, and if the user selects the region 410 (e.g., by touching any part of that region in the display portion 202) to indicate the location of interest, then each of the images in the image stack 300 is accessed and a region corresponding to the location of interest (corresponding to the region 410) is identified in each of those images. The regions corresponding to the location of interest are evaluated to identify which of those regions is deemed to be the best with respect to focus and exposure, and the image that contains the region deemed best is then displayed in the display portion 202. In one embodiment, once a location of interest is selected by the user, the white balance appropriate for that location is applied to the entire image.

Figure 4B:
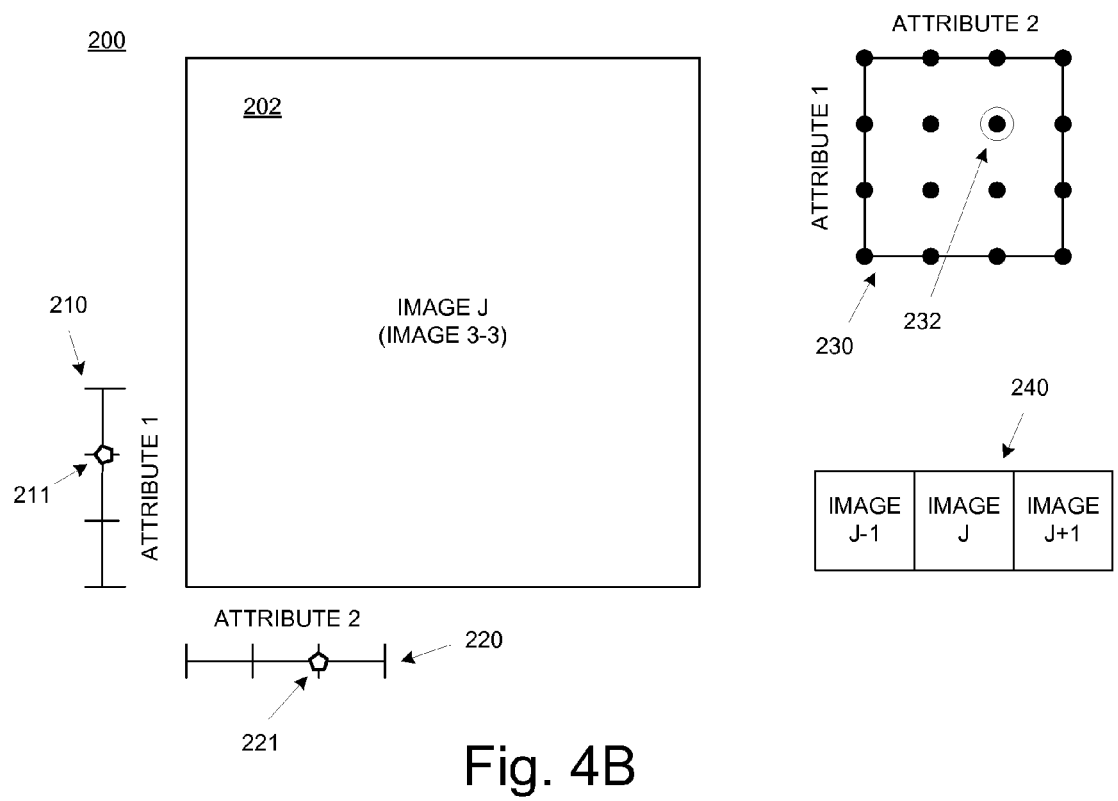

In the example of FIG. 4A, the image 2-3 is on display in the display portion 202. If, for example, the region 410 is identified by the user as the location of interest, then the evaluations mentioned above are performed and another image—the image that contains a region that corresponds to the location of interest and that is rated best with regard to the imaging attribute(s) (focus and/or exposure, for example)—is displayed in the display portion 202, as shown in FIG. 4B. In the example of FIG. 4B, an image J that is different from that displayed in FIG. 4A is displayed (although that need not be the case), and the other GUI elements 210, 211, 220, 221, and 230 are updated accordingly.

The results of the evaluations can also be stored so that the aforementioned evaluations need not be repeated each time a location of interest is identified. Alternatively, the evaluations can be performed in advance and the results stored (e.g., in the memory 104 of FIG. 1). Also, in one embodiment, a distance d can be specified; if a second location of interest is within the distance d of a previously selected location of interest, then the image that was selected based on the previously selected location of interest is also selected for the second location of interest.

The operations described above are summarized in FIGS. 5A, 5B, 5C, and 5D. FIG. 5A represents a capture stage, in which a camera records a two-dimensional stack of images (e.g., the image stack 300) at various camera settings. In the example of FIG. 5A, the images are captured over a range of focus settings and over a range of exposure settings. Additional versions of the images may be created by applying different white-balancing color transformations.

FIG. 5B represents an interaction stage, in which a user identifies a location of interest by, for example, touching the display portion 202 of the touch screen display 107 (FIG. 1), in which a first image (image K) is displayed. A user can also interact with the image stack by manipulating the other GUI elements 210, 211, 220, 221, and 230 as previously described herein.

FIG. 5C represents an update stage, in which the user's actions in the interaction stage are interpreted and applied. The update stage includes heuristics 510 that can be used to evaluate images in the image stack 300 based on the attributes of those images (e.g., based on focus and/or exposure setting (s)). If the user identifies a location of interest in the interaction stage, then the heuristics 510 are used to select an image (image J) that includes a region that corresponds to the location of interest and deemed to be the best according to the heuristics 510. If, instead, the user manipulates the other GUI elements 210, 211, 220, 221, and 230 to choose certain settings (e.g., to choose a particular focus setting and/or a particular exposure setting), then the image that corresponds to those settings is selected. Personal preferences for a location of interest can also be recorded and subsequently applied using an artistic mask 520, as described further below in conjunction with FIGS. 6A and 6B.

FIG. 5D represents a display stage, in which the image selected in the update stage (image J) is presented to the user, for further exploration or to be bookmarked for subsequent access and display, for example. Bookmarks can be used to place the images in particular display order so that the images can, for example, be presented as single-scene slide show that guides a viewer through a tour of the scene captured by the image stack; this may be referred to herein as a dynamic stack tour. A dynamic stack tour is an animated, single-scene slide show that plays back a dynamic stack exploration session as a series of bookmarked locations in the viewing parameter space. A user or someone else (e.g., the photographer) determines the path the dynamic stack tour takes through the viewing parameter space, which in turn can determine a story the viewer will see. A user can determine the path that constitutes the dynamic stack tour by, for example, touching various points in the image to select various locations of interest; the selected locations of interest are used to select the best image in the image stack for each location of interest as described above. The selected images can subsequently be played back in an order specified by the user. The play-back order may be initially defined automatically by the order in which the user touches the various locations of interest; the play-back order can then be manually changed by the user at any time. Alternatively, a user can manually select the various images to be included in the dynamic stack tour and manually define the play-back order. Other effects, such as sound effects including music, can be added and synchronized with the images as they are displayed.

From the user's point of view, the interaction is, in one embodiment, a series of touch events. A first image in an image stack is displayed—this may be referred to herein as a first display instance. The user touches a location of interest in the displayed image, and the display is updated to show that location in the best way with a second image in the image stack that is selected as described above. Alternatively, a first image is displayed, the user changes a setting or settings using the GUI elements 210, 211, 220, 221, and 230, and a second image corresponding to the new setting(s) is displayed. The second displayed image may be referred to herein as a second display instance. The second image may be the same as the first image.

In the display stage, the transition from a first image to a second image can be accomplished in different ways, depending on a measure of the difference between the two images. In general, a difference between a measure of the first attribute for the first image and a measure of the first attribute for the second image is compared to a threshold value. A first approach is used to transition between the first and second images if the difference exceeds the threshold value, and a second approach is used to transition between the first and second images if the difference does not exceed the threshold value.

For example, when the difference in exposure or focus between the first and second images is too large (relative to the threshold value), then the transition can be accomplished by interpolating between the two images to emulate the adaptation process that is performed by the human eye. Otherwise, cross-fading between the two images is aesthetically pleasing and can be used. Another metric to decide which transition method may be used could be the visibility of the areas that are not the location of interest. Also, the user can specify which transition approach to use.

Figure 6A:
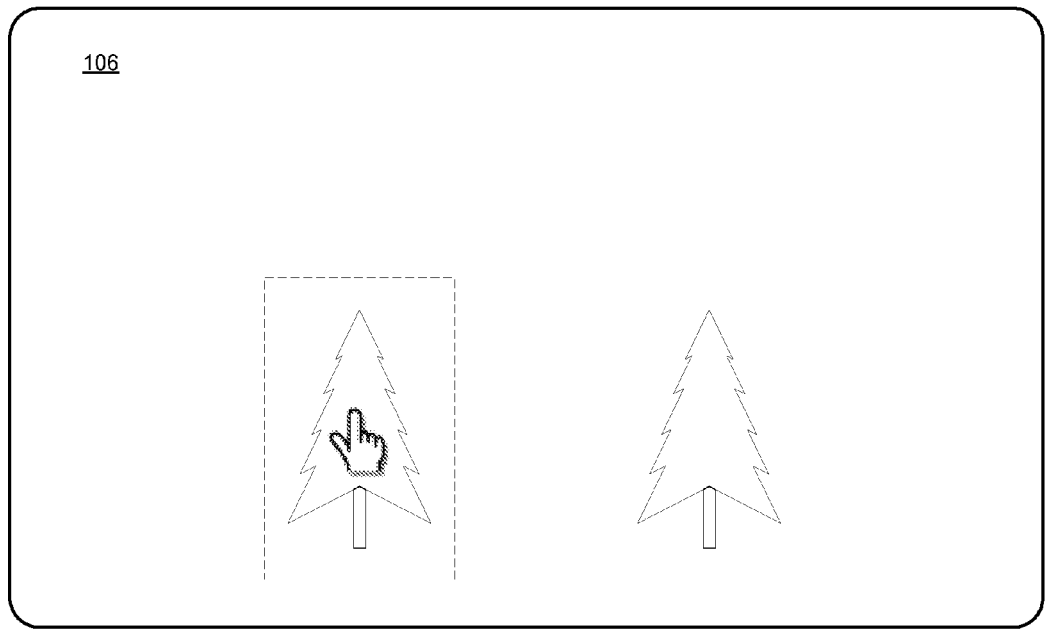
FIGS. 6A and 6B illustrate examples of a graphical user interface for interacting with images in an image stack in an embodiment according to the present invention.
Figure 6B:
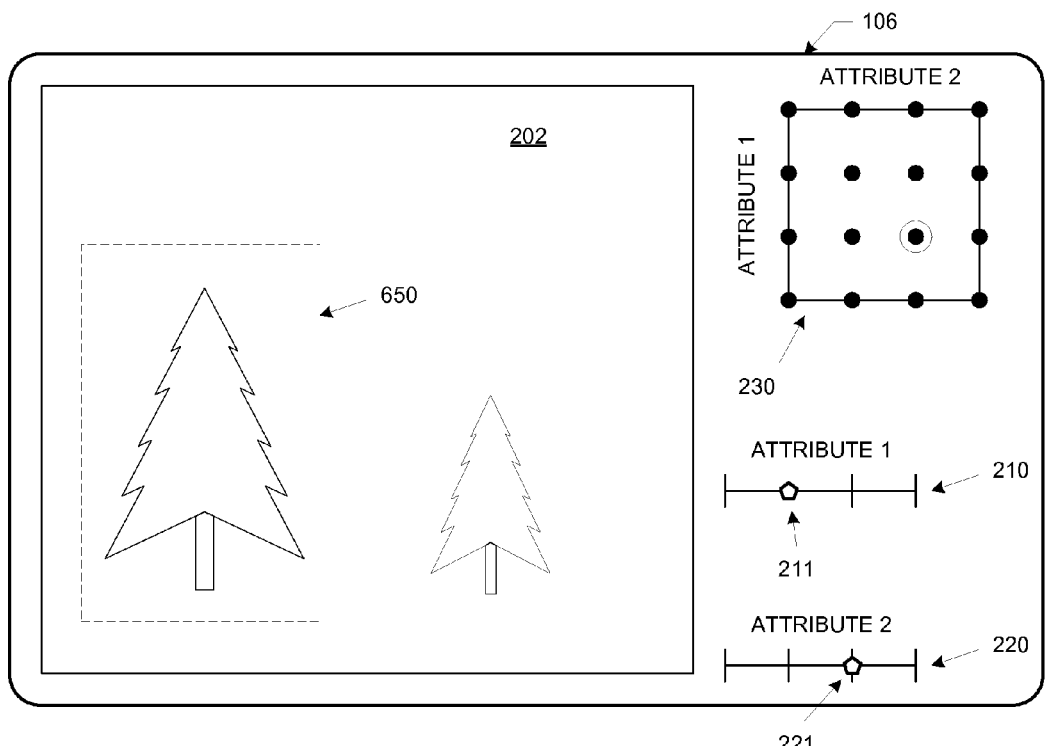

As mentioned above, in the update stage, a user can make and have recorded a personal preference for each location of interest. With reference to FIG. 6A, to initiate the process of making and recording personal preferences, in one embodiment, a user touches a location of interest for a longer period of time (relative to the period of time needed to simply identify a location of interest). The long-press event is used to indicate that the user wants to manually select how the location of interest should look. With reference to FIG. 6B, in response to the long-press event, a zoom loupe 650 is opened for the location of interest, and manual controls (e.g., the GUI elements 210, 211, 220, 221, and 230 described previously herein) are exposed. In the zoom loupe 650, the location of interest is magnified. With reference to FIG. 5C, an artistic map 520 is built in response to the user's manipulation of the manual controls (e.g., the GUI elements 210, 211, 220, 221, and 230). For example, when the user moves an indicator 211 or 221 to indicate a preferred setting for a location of interest, a control point is created and the preferred setting is recorded in the artistic map 520 for the location of interest. After a control point is created, the recorded (preferred) setting will subsequently override the corresponding setting selected using the heuristics 510 whenever the location of interest is again touched by a user. Generally speaking, after a user changes a setting for a location of interest (e.g., after a slider interaction), the location of interest is segmented and any subsequent touch on the segmented location results in use of the recorded setting. In one embodiment, to reduce the computational time associated with a full segmentation or object recognition, an approximation of a joint-bilateral filter is used. In one such embodiment, a touch event on the pixel (x, y) is converted to five-dimensional (x, y, R (red), G (green), B (blue)) space; if a control point in the artistic map 520 is within a given distance d of the current location in the five-dimensional space, then the recorded (preferred) settings are used for the control point and, otherwise, the settings determined using the heuristics 510 are used. Thus, if a subsequent touch is close enough to a previous touch (within the distance d of the earlier touch), then the heuristics 510 are overridden and the recorded setting is applied.

Figure 7:
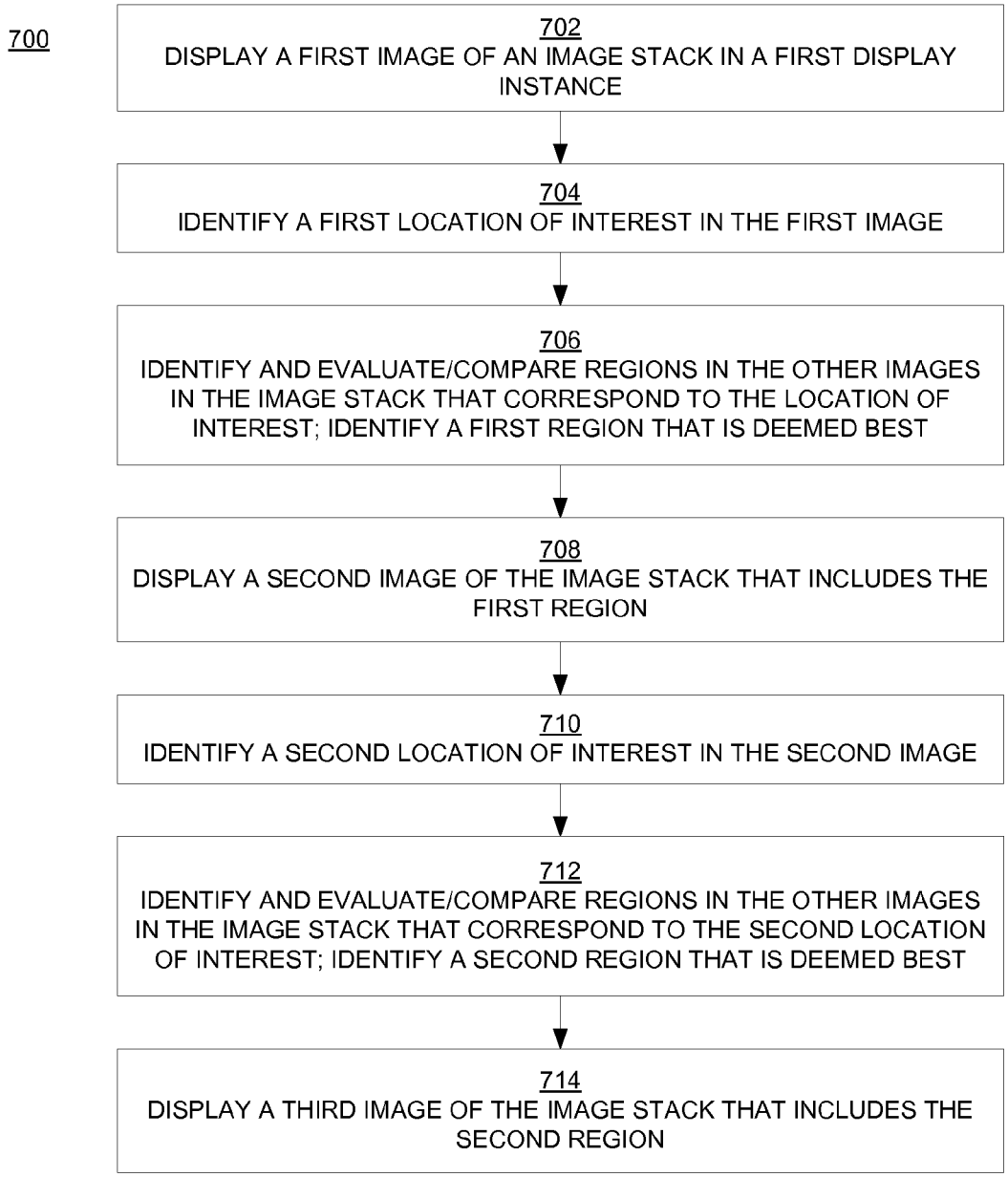
FIG. 7 is a flowchart of an example of a computer-implemented method for interacting with images in an image stack in an embodiment according to the present invention.

FIG. 7 is a flowchart 700 of an example of a computer-implemented method for interacting with images in an image stack in an embodiment according to the present invention. The flowchart 700 can be implemented as computer-executable instructions residing on some form of computer-readable storage medium (e.g., using the computing system 100 of FIG. 1). FIG. 7 is described in conjunction with FIG. 8, which illustrates different images comprising an image stack 800.

The image stack 800 is stored in memory and includes multiple images A-I of a scene having different attributes associated therewith (e.g., the images are captured at different camera settings), as previously described herein. In block 702, a first image (e.g., image A) is selected from the image stack 800 and displayed in a first display instance. The image displayed in the first display instance can be any of the images in the image stack 800.

In block 704, information that identifies a first location of interest L1 in the first image A is received. The first location of interest L1 may correspond to a particular object in the scene. Generally speaking, in one embodiment, a user identifies a location in the first image A, and the location of interest is defined as a region around that location.

In block 706, regions R1-R8 in the other images in the image stack 800 that correspond to the first location of interest L1 are identified. The regions R1-R8 and the equivalent region that includes the first location of interest L1 are evaluated (e.g., compared to each other), to determine a first region (e.g., region R1 of image B) that is rated best out of those regions with respect to one or more of the associated attributes (e.g., camera settings).

In block 708, in a second display instance, a second image selected from the set of images is displayed, where the second image includes the first region identified in block 706 (e.g., image B includes region R1).

In block 710, information that identifies a second location of interest L2 in the second image (image B) is received. The second location of interest L2 may correspond to a particular object in the scene. In one embodiment, the user identifies a location in the second image B, and the second location of interest L2 is defined as a region around that location.

In block 712, regions R9-R16 in the images that correspond to the second location of interest L2 are identified. The regions R9-R16 and the comparable region that includes the second location of interest L2 are compared to determine a second region (e.g., region R15 of image H) that is rated best out of those regions with respect to one or more of the associated attributes (e.g., camera settings).

In block 714, in a third display instance, a third image selected from the set of images is displayed, where the third image includes the second region identified in block 712 (e.g., image H includes region R15).

In blocks 704 and 710 of FIG. 7, the first and second locations of interest can be identified using a touch interface such as the touch screen display 107 of FIG. 1. The touch interface essentially serves as a proxy for gaze tracking to identify locations of interest to a user. Other mechanisms can be used to identify locations of interest. For example, the user's eyes can be tracked to identify what portion of the displayed image the user is looking at, or a audio-based mechanism can be used (e.g., the user states what portion of the displayed image is of interest).

As noted previously herein, the images in an image stack are captured sequentially at different settings and thus are captured over some interval of time. Even if that interval is very short, an object in the scene or the camera itself might move while the image stack is being captured. To compensate for movement while the image stack is being captured, embodiments according to the invention track the location of interest (e.g., an object in the region defined by location of interest) across the images in the image stack, in order to identify the region in each image corresponding to the location of interest. Conventional registration techniques, such as a naïve nearest neighbor search, are expected to fail because, in one embodiment, both exposure and/or focus may change from one image to the next in the image stack, and because the region being tracked (the location of interest) is relatively small and offers few keypoints.

Embodiments according to the invention do not require pixel-accurate registration. The interaction provided by dynamic image stacks is pleasing if the accuracy of the registration is within a width of a typical user's fingertip.

Focus differences between images in an image stack can be addressed by operating on thumbnails where focus differences are less significant. For exposure, in one embodiment, percentile images, where the luminance value of a pixel is replaced with its position in the image's histogram, are created instead of directly comparing regions from two images. With this domain change, a standard sum-of-absolute-difference approach works well across both the exposure and focus domains.

More specifically, in one embodiment, to compensate for changes in focus and exposure, the input images are downsampled and normalized using histogram equalization. A search for nearest-neighbor patches (roughly fingertip size at 17×17 pixels) is conducted in a local window (55×55 pixels) surrounding the corresponding location in the other images of the stack. The patch distance uses the sum-of-absolute differences metric.

An alternative solution is that of computing keypoints on all the images in an image stack offline. When a user identifies a location of interest in an image, some number of closest keypoints in the image can be found; the corresponding region in another image in the image stack is the one containing matching keypoints, possibly weighted based on distance and possibly after removing keypoints across strong boundaries.

The computational time can be reduced by searching an image stack in two phases: the first phase finds, for the regions corresponding to the location of interest, the images that are deemed best with respect to one attribute (e.g., exposure), holding the second attribute (e.g., focus) constant; the second phase searches over the images found in the first phase to find the image deemed best with respect to the second attribute. Note that this type of search can also be performed offline, and the results can be cached for each pixel.

Figure 9:
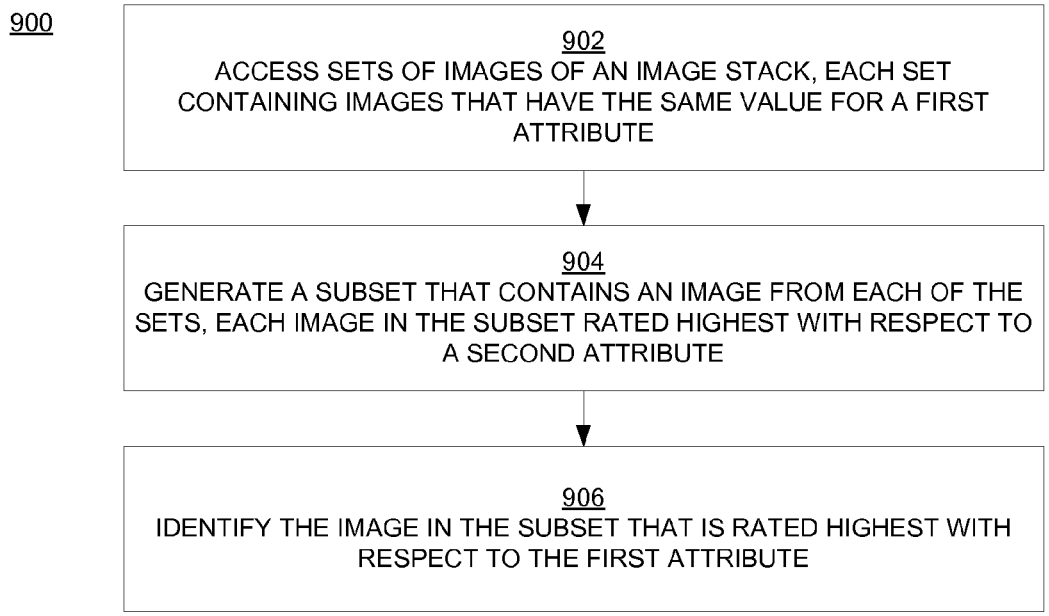
FIG. 9 is a flowchart of an example of a computer-implemented method for evaluating images in an image stack in an embodiment according to the present invention.

FIG. 9 is a flowchart 900 of an example of a computer-implemented method for evaluating images in an image stack in an embodiment according to the present invention. The flowchart 900 can be implemented as computer-executable instructions residing on some form of computer-readable storage medium (e.g., using the computing system 100 of FIG. 1). FIG. 9 is discussed in the context of an example using two different attributes or camera settings, but that example can be readily extended to implementations in which more than two settings are used, and can also be applied to implementations in which a single attribute or setting is used.

In block 902, sets of images in an image stack are accessed. Each of the sets consists of images that have the same value for a first attribute (e.g., a first camera setting). In other words, for example, a first set of the images in an image stack is accessed, where each image in the first set has the same focus setting; a second set of images in the image stack is accessed, each image in the second stack having the same focus setting (different from the focus setting of the first set); and so on.

In block 904, a subset of the images is generated, where the subset includes an image from each of the sets of images. The subset is generated by evaluating the images in each of the sets for each value of a second attribute (e.g., a second camera setting) to identify an image per set that includes a region that corresponds to the location of interest and that is deemed best (rated highest) with respect to the second attribute, relative to other regions per set. In other words, continuing the above example, images in the first set of images are evaluated to identify which image in the first set includes a region corresponding to the location of interest and is deemed to be best with respect to exposure; images in the second set of images are evaluated to identify which image in the second set includes a region corresponding to the location of interest and is deemed best (rated highest) with respect to exposure; and so on. As a result, the aforementioned subset of the images is generated, where the subset includes the images deemed best with respect to exposure for each value of focus.

In block 906, the subset of images is evaluated for each value of the first attribute to identify the image that includes the region corresponding to the location of interest and that is deemed best (rated highest) with respect to the first attribute. In other words, continuing the above example, the subset of images rated highest with respect to focus are evaluated to identify the image that is also rated highest with respect to exposure.

In one embodiment, to determine the images with the best exposure (those described in block 904) at each focus setting, exposures yielding mean gray values that are a weighted average of a patch's histogram equalized gray value and 50 percent are selected; the patch's normalized gray value is weighted at one-third the influence of the fixed 50 percent target. Another approach is to choose the exposure level that yields an average gray value near 50 percent—bright enough to not be dominated by noise, but unlikely to saturate many pixels. However, in practice, the latter approach may be too aggressive for objects with particularly high or low albedo.

Once the images with the best exposure per focus setting are chosen, in one embodiment, an image with the best focus (the image of block 806) is chosen by maximizing contrast (sum of absolute Laplacians) in the gray scale patch.

In summary, embodiments according to the present invention can access an image stack that is captured with a standard camera, track a user's attention (e.g., via a touch screen or other mechanism), and pick an image that best shows the area that the user is paying attention to, explicitly avoiding the creation of a single image summarizing the stack, and providing an engaging alternative to the traditional paradigm of capture plus static viewing or printing.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

The process parameters and sequence of steps described and/or illustrated herein are given by way of example only. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. These software modules may configure a computing system to perform one or more of the example embodiments disclosed herein. One or more of the software modules disclosed herein may be implemented in a cloud computing environment. Cloud computing environments may provide various services and applications via the Internet. These cloud-based services (e.g., software as a service, platform as a service, infrastructure as a service, etc.) may be accessible through a Web browser or other remote interface. Various functions described herein may be provided through a remote desktop environment or any other cloud-based computing environment.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

Embodiments according to the invention are thus described. While the present disclosure has been described in particular embodiments, it should be appreciated that the invention should not be construed as limited by such embodiments, but rather construed according to the below claims.

What is claimed is:

1. A non-transitory computer-readable storage medium having computer-executable instructions that, when executed, perform a method comprising:
   displaying, in a first display instance, a first image selected from a plurality of images stored in a memory, the plurality of images comprising images of a scene, the plurality of images captured sequentially during a time interval at a plurality of different values for a first attribute;
   receiving information that identifies a portion of the first image comprising a first location of interest within the first image;
   identifying and selecting a second image of the plurality of images that includes a region within the second image that corresponds to the first location of interest and that is rated highest, with respect to the first attribute, relative to other regions in the plurality of images that also correspond to the first location of interest, wherein the second image has a first value for the first attribute, wherein the plurality of images further comprises images of the scene captured over a plurality of different values for a second attribute at each value of the first attribute, wherein the region is also rated highest with respect to the second attribute relative to other regions in a subset of images of the plurality of images, the subset of images also having the first value for the first attribute; and
   displaying, in a second display instance, the second image.

2. The non-transitory computer-readable medium of claim 1 wherein the method further comprises:
   accessing sets of the plurality of the images, each of the sets comprising images that have a same value for the first attribute;
   generating a subset of the plurality of images, wherein the subset comprises an image from each of the sets of images, the subset generated by evaluating the images in each of the sets for each value of the second attribute to identify an image per set comprising a region that corresponds to the first location of interest and that is rated highest, with respect to the second attribute, relative to other regions per set; and
   evaluating the subset of the plurality of images for each value of the first attribute to identify and select the second image.

3. The non-transitory computer-readable medium of claim 1 wherein the first attribute comprises a first camera setting and the second attribute comprises a second camera setting, wherein the first camera setting and the second camera setting are selected from the group consisting of: exposure time; focus distance; and white balance.

4. The non-transitory computer-readable medium of claim 1 wherein the method further comprises displaying a graphical user interface element comprising a two-dimensional array having a first axis that corresponds to the first attribute and a second axis that corresponds to the second attribute, wherein a position within the array corresponds to a tuple of the first attribute and the second attribute.

5. The non-transitory computer-readable medium of claim 1 wherein the method further comprises displaying a graphical user interface element comprising an indicator and a slider bar, wherein a position of the indicator relative to the slider bar corresponds to a value for the first attribute.

6. The non-transitory computer-readable medium of claim 1 wherein the method further comprises specifying an order in which the first image and the second image are to be subsequently displayed.

7. The non-transitory computer-readable medium of claim 1 wherein the method further comprises:
   comparing, to a threshold value, a difference between a measure of the first attribute for the first image and a measure of the first attribute for the second image; and
   displaying the first image and then displaying the second image, wherein a first approach is used to transition between the first and second images if the difference exceeds the threshold value and a second approach is used to transition between the first and second images if the difference does not exceed the threshold value.

8. The non-transitory computer-readable medium of claim 1 wherein the method further comprises tracking the first location of interest in each of the images to identify the regions in the plurality of images corresponding to the first location of interest.

9. The non-transitory computer-readable medium of claim 1 wherein the method further comprises:
   receiving information that identifies a second location of interest in the second image; and
   continue displaying the second image selected if the second location of interest is less than a specified distance from the first location of interest.

10. A computer system comprising:
    a processor;
    a display coupled to the processor; and
    memory coupled to the processor, the memory having stored therein instructions that, if executed by the computer system, cause the computer system to execute operations comprising:
       displaying, in a first display instance, a first image selected from a plurality of images stored in a memory, the plurality of images comprising images of a scene, the plurality of images captured sequentially during a time interval at a plurality of different values for a first camera setting;
       receiving information that identifies a portion of the first image comprising a first location of interest within the first image;

identifying regions in the plurality of images, the regions corresponding to the first location of interest; and selecting and displaying, in a second display instance, a second image of the plurality of images, wherein the second image comprises a region of the regions that is rated highest among the regions with respect to the first camera setting, wherein said selecting comprises:

accessing sets of the plurality of the images, each of the sets comprising images that have a same value for the first camera setting;

generating a subset of the plurality of images, wherein the subset comprises an image from each of the sets of images, the subset generated by evaluating the images in each of the sets for each value of a second camera setting to identify an image per set comprising a region that corresponds to the location of interest and that is rated highest, with respect to the second camera setting, relative to other regions per set; and evaluating the subset of the plurality of images for each value of the first camera setting to identify and select the second image.

11. The computer system of claim 10 wherein the first camera setting and the second camera setting are selected from the group consisting of: exposure time; focus distance; and white balance.

12. The computer system of claim 11 wherein the operations further comprise displaying a graphical user interface element comprising a two-dimensional array having a first axis that corresponds to the first camera setting and a second axis that corresponds to the second camera setting, wherein a position within the array corresponds to a tuple of the first camera setting and the camera setting.

13. The computer system of claim 11 wherein the operations further comprise displaying a graphical user interface element comprising an indicator and a slider bar, wherein a position of the indicator relative to the slider bar corresponds to a value for the first camera setting.

14. The computer system of claim 10 wherein the operations further comprise specifying an order in which the first image and the second image are to be subsequently displayed.

15. A method comprising:

displaying, in a first display instance, a first image selected from a plurality of images stored in a memory, the plurality of images comprising images of a scene, the plurality of images captured sequentially during a time interval at a plurality of different values for a first attribute;

receiving information that identifies a portion of the first image comprising a first location of interest within the first image;

comparing a first plurality of regions in the images, the first plurality of regions corresponding to the first location of interest, to determine a first region that is rated best of the first plurality of regions with respect to the first attribute;

displaying, in a second display instance, a second image selected from the plurality of images, the second image comprising the first region, wherein the second image has a first value for the first attribute, wherein the plurality of images further comprises images of the scene captured over a plurality of different values for a second attribute at each value of the first attribute, wherein the first region is also rated best with respect to the second attribute relative to other regions in a subset of images of the plurality of images, the subset of images also having the first value for the first attribute;

receiving information that identifies a portion of the second image comprising a second location of interest in the second image;

comparing a second plurality of regions in the images, the second plurality of regions corresponding to the second location of interest, to determine a second region that is rated best of the second plurality of regions with respect to the first attribute; and displaying, in a third display instance, a third image selected from the plurality of images, the third image comprising the second region.

16. The method of claim 15 further comprising:

accessing sets of the plurality of the images, each of the sets comprising images that have a same value for the first attribute;

generating a subset of the plurality of images, wherein the subset comprises an image from each of the sets of images, the subset generated by evaluating the images in each of the sets for each value of a second attribute to identify an image per set comprising a region that corresponds to the first location of interest and that is rated highest, with respect to the second attribute, relative to other regions per set; and evaluating the subset of the plurality of images for each value of the first attribute to select the second image.

17. The method of claim 15 further comprising displaying a graphical user interface element comprising a two-dimensional array having a first axis that corresponds to the first attribute and a second axis that corresponds to the second attribute, wherein a position within the array corresponds to a tuple of the first attribute and the second attribute.

18. The method of claim 15 further comprising displaying a graphical user interface element comprising an indicator and a slider bar, wherein a position of the indicator relative to the slider bar corresponds to a value for the first attribute.

* * * * *